United States Patent [19]

Gale

[11] 4,100,064

[45] Jul. 11, 1978

[54] PURIFICATION OF WATER BY REVERSE OSMOSIS USING A SUPPORTED SEMI-PERMEABLE MEMBRANE

[75] Inventor: George Martin Gale, Shrewsbury, England

[73] Assignee: United Kingdom Atomic Energy Authority, London, England

[21] Appl. No.: 633,560

[22] Filed: Nov. 19, 1975

Related U.S. Application Data

[63] Continuation of Ser. No. 467,477, May 6, 1974, abandoned, which is a continuation of Ser. No. 304,783, Nov. 8, 1972, abandoned.

[30] Foreign Application Priority Data

Nov. 23, 1971 [GB] United Kingdom ............... 54432/71

[51] Int. Cl.$^2$ ............................................ B01D 13/00
[52] U.S. Cl. ............................ 210/23 H; 210/433 M; 210/490
[58] Field of Search .............. 210/321 R, 433 M, 490; 264/49; 427/245; 260/2.5 AY

[56] References Cited

U.S. PATENT DOCUMENTS

| | | | |
|---|---|---|---|
| 3,430,770 | 3/1969 | Clark et al. ...................... | 210/489 X |
| 3,494,470 | 2/1970 | Banfield ........................... | 210/490 X |
| 3,524,753 | 8/1970 | Sharp ................................ | 427/245 |
| 3,544,358 | 12/1970 | Manjikian ........................ | 210/490 X |
| 3,556,305 | 1/1971 | Shurr ................................. | 210/490 |
| 3,615,024 | 10/1971 | Michaels ............................ | 210/490 |
| 3,648,845 | 3/1972 | Riley ................................. | 210/490 |
| 3,984,490 | 1/1974 | Rainer et al. ...................... | 264/49 X |

*Primary Examiner*—Frank A. Spear, Jr.
*Attorney, Agent, or Firm*—Larson, Taylor and Hinds

[57] ABSTRACT

Water is purified by reverse osmosis using a semipermeable membrane supported by the outer surface of an extruded tube of water-permeable rigid p.v.c. so that impure water is recovered from the bore of the tube, the p.v.c. having an apparent density of from 0.5 to 1.3 g/cc, and an average pore diameter of from 5 to 500 microns, at least 50% of the pores being interconnected and 95 to 99.5% of the pores in the tube being accessible from the inner or outer surface thereof, the tube having 1 to 10 holes/mm$^2$ on the outer surface thereof, and having no surface holes larger than 400 microns in diameter and external diameter of from 1.5mm to 8mm and having a wall thickness of at least 0.5mm.

3 Claims, No Drawings

PURIFICATION OF WATER BY REVERSE OSMOSIS USING A SUPPORTED SEMI-PERMEABLE MEMBRANE

This is a continuation of application Ser. No. 467,477 filed May 6, 1974, which in turn is a continuation of application Ser. No. 304,783 of Nov. 8, 1972 both now abandoned.

This invention relates to porous plastics materials, and in particular to porous rigid polyvinyl chloride (pvc). The general principles of using blowing agents and extractable fillers to expand pvc are well known. Non-porous rigid and plasticised pvc foams have been made by extrusion and moulding techniques. Plasticised pvc products are widely used as battery separators and breathable upholstery materials and are generally made by moulding and paste spreading techniques, porosity being achieved if desired by a variety of techniques.

Pvc is a cheap plastics material, and there would be a widespread commercial usage for porous rigid pvc. Nevertheless, porous rigid pvc is not available commercially. There is a widespread belief that the amount of blowing agent which would be needed to make the material porous would be so large that the material would collapse under stress, or indeed disintegrate spontaneously.

British patent specification No. 1,137,339 does describe and claim a process for making porous rigid pvc. The process is analogous to that successfully used in the manufacture of expanded polystyrene, and comprises extruding a mixture of pvc with a physical blowing agent, such as decane, under carefully controlled conditions. The process is capable of producing coarse foams of low density. But, as pvc is a notoriously more difficult material to process than polystyrene, the process was never made to work satisfactorily, and has never, so far as we are aware, been operated commercially.

One use of porous rigid pvc with which the present invention is particularly, though not exclusively, concerned is as a support material for the semi-permeable membrane used in water purification by reverse osmosis. For this use, the pvc needs to have a large number of small interconnected pores per unit area of surface, and a complete lack of large surface holes. Physical blowing agents are not, in general, capable of providing these properties.

The present invention provides porous rigid pvc having an apparent density of from 0.5 to 1.3 g/cc, and an average pore diameter of from 5 to 500 microns, at least 50% of the pores being interconnected.

By pvc we mean a homopolymer of vinyl chloride; or a copolymer of at least 90 molar per cent of vinyl chloride with not more than 10 molar per cent of a copolymerisable ethylenically unsaturated monomer, for example, another vinyl ester or an alkyl ester of an ethylenically unsaturated mono- or di-carboxylic acid; or a blend of a vinyl chloride homopolymer with a vinyl chloride copolymer, the blend containing not more than 10 molar per cent of units derived from monomers other than vinyl chloride. We prefer to use the homopolymer of vinyl chloride because of its good all-around properties and high softening point.

By rigid pvc we mean essentially unplasticised pvc, that is to say, pvc containing not more than 10% by weight of plasticiser. We prefer to use entirely unplasticised pvc.

This porous rigid pvc is preferably provided in the form of an extruded tube which may have an outer diameter of from 1 mm to 10 cm or larger. Such tubes have utility in various fields, including water purification as mentioned above, irrigation and for filters and aerators, and are more fully described below.

Inasmuch as it is generally obtained using organic chemical blowing agents, the porous rigid pvc of this invention is generally characterized by containing the decomposition products of such an organic chemical blowing agent.

The present invention also provides a method of making porous rigid pvc, which method comprises extruding or moulding a stabilized rigid pvc mix containing from 0.5% to 3.0%, by weight on the weight of the pvc, of a chemical blowing agent.

A chemical blowing agent is one which undergoes chemical decomposition with gas or vapor generation at an elevated temperature; it is to be contrasted with a physical blowing agent, which is one that merely vaporises without chemical change at elevated temperature. A hydrated salt which gives up water of crystallisation at an elevated temperature is a chemical blowing agent, but is not preferred in the present invention.

Complex organic compounds which, when heated, decompose to yield an inert gas and have residues which are compatible with the pvc are preferred as blowing agents. Such materials have the property of decomposition over a narrow temperature range which is particularly desirable for obtaining a good pore structure. Compounds having the $>N-N<$ and $-N=N-$ linkages decompose at elevated temperatures to yield an inert gas high in nitrogen content. Typical compounds include substituted nitroso compounds, substituted hydrazides, substituted azo compounds, acid azides, and guanyl compounds.

The chemical blowing agent must be decomposed an effective amount below the decomposition temperature of the pvc. On the other hand, the minimum initial decomposition temperature must be sufficiently high that premature gas evolution during mixing is avoided. Blowing agents which decompose between 150° C and 230° C are generally suitable. Many chemical blowing agents decomposing within this temperature range are available commercially. A typical and preferred blowing agent is azodicarbonamide, whose range of decomposition temperatures is from 160° C to 200° C.

The amount of blowing agent employed must be sufficiently great to impart a desired porosity to the product, but not so great that the product disintegrates spontaneously or under weak stress. Suitable blowing agent concentrations lie within the range from 0.5% to 3.0%, and usually from 1.0% to 2%, by weight on the weight of the pvc. Within this range, the blowing agent concentration needs to be carefully chosen in relation to the extrusion conditions, and, more importantly, to the nature and amount of the stabiliser used in the pvc mix.

As is well known, stabilizers are normally included in pvc mixes, and are generally regarded as essential when the mix is to be extruded. Stabilizers based on such metals as barium, cadmium, calcium, lead, strontium, lead, tin, and zinc are commonly used. Other stabilizers, generally used in conjunction with metal stabilizers, include aromatic esters and compounds with weak organic acid radicals and epoxidized soyabean oil. Proportions required to stabilise pvc during extrusion are normally less than 10% by weight, particularly from 1.5% to 5.0% by weight, on the weight of the pvc.

As is also well known, many stabilizers, particularly metal stabilizers, for pvc act as kickers for chemical blowing agents. That is to say, the presence of a stabilizer in a pvc mix containing a chemical blowing agent increases the rate of decomposition of the blowing agent at any given temperature and lowers the overall decomposition temperature range of the blowing agent. It is our experience that this kicker effect increases on the following scale of pvc stabilizers:

Tribasic lead salts < Calcium/zinc salts < Cadmium salts.

The amount of chemical blowing agent has to be carefully chosen in light of the pvc stabilizer being used. Thus, for example, with tribasic lead stabilizers, e.g. tribasic lead sulphate, it is desirable to use from 1.8% to 2.2% by weight of blowing agent; with calcium/zinc stabilizers, it is desirable to use from 1.0% to 1.4% by weight of blowing agent. Proportions of blowing agent as low as 0.5% by weight may be appropriate when pvc stabilizers are used which are very potent kickers for the blowing agent; proportions as high as 3.0% by weight may be appropriate when pvc stabilizers are used which have little or no kicking effect.

The pvc needs to be in powder form in order to ensure thorough admixture with the other ingredients, particularly the blowing agent. Suspension polymerised pvc is cheap and perfectly satisfactory for use according to the invention for most purposes. Emulsion polymerised pvc is somewhat more expensive and has a smaller particle size which makes it more difficult to handle; but more uniform powders can be obtained by thorough mixing, giving rise to a more uniform pore structure in the product. It may be preferable to use a blend of suspension and emulsion polymers so as to take advantage of the good properties of each.

The pvc mix preferably contains a filler. A filler not only reduces the unit cost of the porous product, but also helps to promote porosity. Quite how this effect works is not clear, but it is possible that the filler particles act as nuclei for the blowing agent, or that the filler helps to promote interconnections between the pores. The use of large quantities of filler reduces the strength of the product, and it is preferred to use not more than 12%, for example from 5% to 10%, by weight of filler on the weight of the pvc.

Any inert filler may be used; examples are talc, calcium carbonate and silica. We prefer to use stearate-coated precipitated chalk because we find that these materials, in suitable quantities, can improve the impact strength of the porous product.

It is possible to further improve the impact strength of the porous product by incorporating a polymeric impact modifier into the pvc mix. For this purpose there may be used up to 5%, or in extreme cases 10%, by weight on the weight of the pvc of powdered materials such as nitrile rubbers, acrylic copolymers and acrylonitrile-butadiene-styrene copolymers. However, these polymeric impact modifiers all have the effect of severely reducing the porosity of the product at a given apparent density. Their use inevitably represents a compromise between porosity and impact strength. In general, we much prefer to avoid the use of polymeric impact modifiers altogether, and to achieve the desired impact strength in some other way, e.g. by altering the dimensions of the extrudate.

Insofar as it is an object of this invention to provide porous rigid pvc with a uniform fine pore structure free from large cavities, this invention does not contemplate the use of significant amounts of physical blowing agents, or of salts which can be leached out of the extrudate, in addition to the chemical blowing agents already discussed.

The pvc mix will generally contain one or more lubricants to improve processability, as is conventional in the art. It may be noted that certain lubricants may act as kickers for the commonly used organic blowing agents. The pvc mix may contain other additives as generally used in the art, provided that these do not adversely affect the action of the blowing agent in providing a porous product.

The various ingredients are thoroughly mixed together, care being taken to completely disperse the blowing agent in the pvc without decomposing the blowing agent. Extrusion can be performed on available equipment, although additional heating elements may be required to provide the rather careful temperature control needed. I have successfully used a single screw extruder provided with five separate heat controls, three on the barrel, one on the die head, and one adjacent the tip of the die. The die temperature is preferably kept within the range of 165° C to 205° C, particularly from 170° C to 200° C, and is generally as high or higher than the barrel temperature. The barrel temperature may suitably rise to a maximum of from 160° C to 200° C, preferably from 170° C to 190° C.

The dimensions of the extrudate can be controlled to some extent by altering the degree of draw-down, i.e. the rate at which the extrudate is stretched as it leaves the tip of the die. Decomposition of the blowing agent during extrusion causes substantial expansion of the extrudate immediately after it leaves the tip of the die and this may be countered by stretching. The dimensions of the die may thus be either larger or smaller, by as much as 20%, than the desired dimensions of the extrudate. Draw-down is advantageous in that the stretching effect aligns the polymer molecules and increases the flexural strength of the solid product.

The extrudate may be cooled, e.g. with water or air, and collected, e.g. by winding up on a reel, for storage or use.

When the product is intended for use in water purification by reverse osmosis, the material is preferably extruded in the form of a tube having an external diameter of from 1.5 mm to 8 mm, particularly from 2 mm to 4 mm. The central hole is provided by a mandrel in the die which may, but need not, contain an axial hole for the supply of gas to prevent the tube from collapsing. The internal diameter of the tube (which determines the wall thickness) needs to be large enough to provide adequate porosity through the tube wall, and small enough for the tube to have adequate strength. The internal diameter also needs to be large enough for the total water produced along the length of the tube to flow out of one end of the tube without more than 10–30 psi pressure drop between the closed and open end. These conflicting requirements are likely to require that the wall thickness be at least 0.5 mm, and that the internal diameter be at least 1.0 mm.

When the product is intended for use other than in water purification by reverse osmosis, the material may be extruded in any of a variety of shapes. For underwater aeration, it is envisaged that 5–25 mm o.d. tubes may be suitable; for irrigation purposes, larger tubes, of e.g. 25–50 mm o.d. are likely to be required; tubes of any size can be used for filtration purposes; flat plates for battery separators may be extruded either as such or as a tube which is slit and opened out to a sheet prior to cooling. The internal dimensions of these tubes are determined by the stresses to which they will be subjected in use.

The products of this invention have an apparent density of from 0.5 to 1.3 and preferably from 0.75 to 1.15, particularly about 0.95, g/cc. By apparent density is meant the weight of the object divided by its overall volume ignoring the fact that part of that volume is in the form of small pores. The density of the pvc mix extruded without blowing agent is about 1.43. This indicates that from 65% to 10% of the extrudate is in the form of pores.

Extrudates having an apparent density of less than 0.5 g/cc are unlikely to have sufficient strength to be useful. Extrudates having an apparent density of more than 1.3 g/cc are unlikely to be sufficiently porous for most purposes.

The pores of the products of this invention have an average diameter of from 20 to 200 microns. The bulk of the pores should have diameters within the range of 5 to 500 microns, preferably of 20 to 200 microns. Tubes intended for use in water purification by reverse osmosis should not have surface holes larger than 500 microns, preferably not larger than 400 microns, because the 125 micron thick semi-permeable membranes used cannot readily bridge holes of this size. If thinner semi-permeable membranes are used in the future, for example down to 25 microns thick, it may be necessary for holes larger than 200 microns to be absent from the surface of the tube.

In order to achieve adequate porosity, at least 50% of the pores in the product must be interconnected. In practice, we find that at least 90%, and generally from 95% to 99.5%, of the pores are accessible from the surface of the product, e.g. from the inside or outside of the tube. Care may need to be taken to avoid blockage of a proportion of the pores at the outside surface of the tube.

For the purification of brackish waters by reverse osmosis, porous tubes need to withstand a pressure of 4 $MN/m^2$ over long periods without crushing or creep. The corresponding figure for the purification of sea water is 10 $MN/m^2$. Suitably dimensioned tubes according to this invention are capable of meeting these requirements.

For water purification by reverse osmosis, 3 mm o.d. tubes need to have a water permeability of at least 10 gallons/day per square foot of surface area (1.17 liters/day/$m^2$) at a pressure differential of 10 psi (0.07 $MN/m^2$). Extruded tubes according to this invention can easily exceed this figure, and can have water permeabilities of from 50 galls/$ft^2$ day (8.5 liters/$m^2$ day) up to 200 galls/$ft^2$ day (34 liters/$m^2$ day) or even higher.

Tubes for use in water purification by reverse osmosis preferably have at least 1 hole/$mm^2$, e.g. from 1 to 10 holes/$mm^2$ of outside surface area. The tubes of this invention for water purification are intended to have the semi-permeable membrane applied to the smooth outer surface and to have impure water in contact with this treated outer surface so that purified water is recovered from the bores of the tubes.

The following example illustrates the invention.

The following formulation was used.

| | % | wt. |
|---|---|---|
| PVC suspension polymer | 50 | 5000 g |

-continued

| | % | wt. |
|---|---|---|
| PVC emulsion polymer | 50 | 5000 g |
| Calcium/zinc "non-toxic" stabilizer | 2.5 | 250 g |
| Epoxidised Soyabean oil | 2.5 | 250 g |
| Glyceryl mono-stearate lubricant | 1.0 | 100 g |
| Stearic acid lubricant | 0.6 | 60 g |
| Filler Calofort S | 7.5 | 750 g |
| Calcium stearate stabilizer/lubricant | 1.0 | 100 g |
| Blowing Agent Azodicarbonamide | 1.1 | 110 g |

The materials were mixed in a high speed mixer which had been prewarmed to 80° C by steam heating. At 115° C mix temperature the blowing agent was added and the complete mix discharged via pneumatically operated valves into a cooler at 125° C. When cooled to below 40° C the mix was discharged into polythene bags for storage until required for extrusion.

The extruder was a Titan mini-extruder manufactured by Betol Machinery Ltd., modified to provide a separate heater adjacent the tip of the die, as well as that provided on the die head and the three provided on the barrel. The pitch of the screw was 25 mm. The die used had an o.d. of 2.9 mm with a mandrel pin of 1.1 mm diameter.

The extrudate was air cooled under tension over a length of 3 meters, water cooled under tension over a length of 2 meters, and wound onto a 50 cm diameter reel.

Extrusion was carried out under the following conditions:

| Barrel temperature | B1 145° C |
| | B2 165° C |
| | B3 185° C |
| Die head | 180° C |
| Die tip | 185° C |
| Screw speed | 32 rpm |
| Motor current | 2.5 amps |
| Haul-off speed | 12 metres/minute |

A continuous length of 4000 meters of the tube was extruded in this way. The tube had the following properties:

| Outside diamter | 3.1–3.2 mm |
| Bore diameter | 1.1 mm |
| Density | 0.93 g/cc |
| Average pore size | 20–200 microns. No surface holes larger than 500 microns |
| % pores accessible | 95 |
| Water permeability | 173 galls/$ft^2$ day (29.4 litres/$m^2$ day) at 0.07 $MN/m^2$ |
| Impact strength (Un-notched tensometer pendulum machine) | 0.09 Joules |

This tube had a smooth outer surface which was suitable for the application of a 125 micron semi-permeable membrane, and the treated tube was suitable for purification of brackish water by reverse osmosis.

We have found that swelling by the blowing agent produces a tube which has a much larger diameter than the extruder die. To allow for this, the die needs to have a smaller diameter than that required of the tube. However, complete compensation for swelling is not possible for very small tubes. We have obtained a reduction to obtain the required diameter by axially drawing the tube whilst it is hot. Such axial drawing, which is controlled by the haul-off speed, has the additional importance of imparting an increase to the water permeability. This is illustrated in a series of examples in which tubes were produced as described above, but using different haul-off speeds, and their water permeabilities measured.

The results are summarised below.

| Haul-off Speed (metres/minute) | Final Outside Diameter of Tube (mm) | Porosity (mls/min on 24" length at 10 p.s.i.) |
| --- | --- | --- |
| 5.96 | 4.6 | non-porous |
| 9.15 | 3.8 | 40 |
| 1.10 | 3.4 | 251 |
| 1.22 | 3.2 | 324 |
| 1.44 | 3.05 | 530 |

We have also found that porosity may be increased by radial expansion of the tube. For example, an extruded tube is reheated to a temperature above the softening print of the pvc and expanded by drawing over a mechanical former. This can be carried out continuously following extrusion.

I claim:

1. In a method for purifying water by reverse osmosis using a semi-permeable membrane, the improvement wherein the membrane is supported by the outer surface of an extruded tube of water-permeable rigid p.v.c. so that impure water is contacted with said outer surface and purified water is recovered from the bore of the tube, the p.v.c. having an apparent density of from 0.5 to 1.3g/cc, and an average pore diameter of from 5 to 500 microns, at least 50% of the pores being interconnected and 95 to 99.5% of the pores in the tube being accessible from the inner or outer surface thereof, the tube having 1 to 10 holes/mm$^2$ on the outer surface thereof, having an external diameter of from 1.5 mm to 8 mm and having a wall thickness of at least 0.5 mm.

2. A method according to claim 1 wherein the apparent density is from 0.75 to 1.15 g/cc.

3. A method according to claim 1 wherein the average pore diameter is from 20 to 200 microns.

* * * * *